United States Patent
Luten et al.

(10) Patent No.: US 9,895,772 B2
(45) Date of Patent: Feb. 20, 2018

(54) SECOND SURFACE LASER ABLATION

(71) Applicant: Gentex Corporation, Zeeland, MI (US)

(72) Inventors: Henry A. Luten, Holland, MI (US);
Kurtis L. Geerlings, Zeeland, MI (US);
Donald L. Bareman, Zeeland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 14/874,263

(22) Filed: Oct. 2, 2015

(65) Prior Publication Data

US 2016/0199936 A1    Jul. 14, 2016

Related U.S. Application Data

(60) Provisional application No. 62/059,351, filed on Oct. 3, 2014.

(51) Int. Cl.
| | |
|---|---|
| *G02B 26/00* | (2006.01) |
| *G02F 1/00* | (2006.01) |
| *G02F 1/153* | (2006.01) |
| *B23K 26/57* | (2014.01) |
| *B23K 26/0622* | (2014.01) |
| *B23K 26/402* | (2014.01) |
| *B29D 11/00* | (2006.01) |
| *B60R 1/08* | (2006.01) |
| *C23C 30/00* | (2006.01) |
| *B23K 26/06* | (2014.01) |
| *B23K 26/362* | (2014.01) |
| *B23K 26/361* | (2014.01) |
| *B23K 103/16* | (2006.01) |

(Continued)

(52) U.S. Cl.
CPC .......... *B23K 26/57* (2015.10); *B23K 26/0624* (2015.10); *B23K 26/0661* (2013.01); *B23K 26/361* (2015.10); *B23K 26/362* (2013.01); *B23K 26/402* (2013.01); *B29D 11/00596* (2013.01); *B60R 1/088* (2013.01); *C23C 30/00* (2013.01); *B23K 2203/08* (2013.01); *B23K 2203/166* (2015.10); *B23K 2203/50* (2015.10); *G02F 1/153* (2013.01)

(58) Field of Classification Search
CPC ...... A61B 17/3213; A61B 2017/00526; A61B 2017/00831; A61B 1/04; A61B 5/0075; A61B 5/0084
USPC ........ 359/242, 245, 248, 250–254, 267–273, 359/315–318, 321, 322
See application file for complete search history.

(56) References Cited

U.S. PATENT DOCUMENTS

| | | | | |
|---|---|---|---|---|
| 5,668,663 A | * | 9/1997 | Varaprasad | ............. B32B 17/06 359/265 |
| 8,842,358 B2 | | 9/2014 | Bareman et al. | |

(Continued)

FOREIGN PATENT DOCUMENTS

WO    WO-2008/119949 A1    10/2008

OTHER PUBLICATIONS

International Search Report and Written Opinion in PCT/US2015/053850 dated Dec. 18, 2015 (10 pages).

*Primary Examiner* — Brandi Thomas
(74) *Attorney, Agent, or Firm* — Foley & Lardner LLP; Bradley D. Johnson

(57) ABSTRACT

A method of removing material from an opposite side of workpiece includes directing a laser beam at a first side of the workpiece to remove the material from an opposite second side of the workpiece.

11 Claims, 4 Drawing Sheets

(51) Int. Cl.
  *B23K 103/00*   (2006.01)
  *B23K 103/08*   (2006.01)

(56) References Cited

U.S. PATENT DOCUMENTS

| | | | |
|---|---|---|---|
| 2006/0020092 A1* | 1/2006 | Chikusa | C08G 61/126 |
| | | | 526/256 |
| 2012/0200007 A1 | 8/2012 | Straw et al. | |
| 2012/0229882 A1 | 9/2012 | Fish et al. | |
| 2013/0153428 A1 | 6/2013 | Akana et al. | |
| 2013/0248837 A1* | 9/2013 | Yokoyama | G02F 1/133555 |
| | | | 257/40 |

* cited by examiner

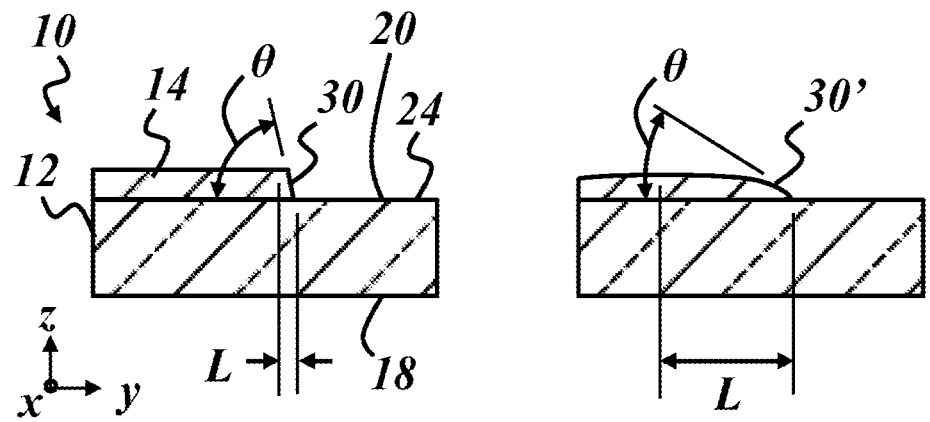
FIG. 3A          FIG. 3B
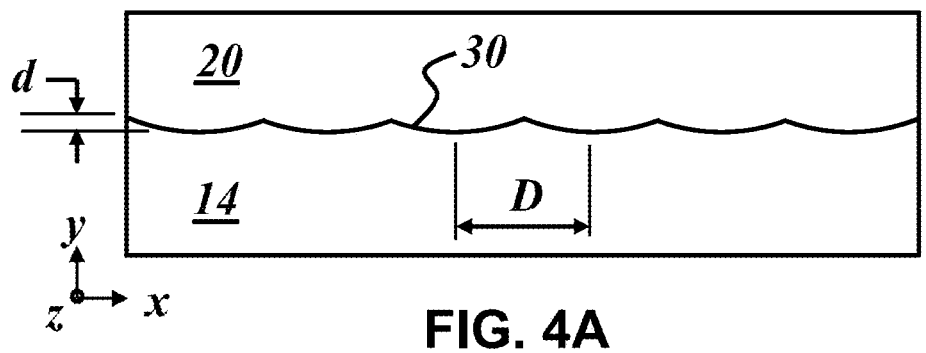
FIG. 4A
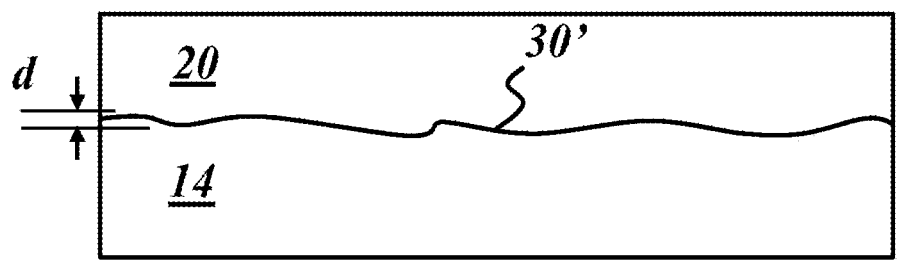
FIG. 4B

SECOND SURFACE LASER ABLATION

CROSS-REFERENCE TO RELATED APPLICATIONS

This application claims the benefit of U.S. Provisional Patent Application No. 62/059,351, filed on Oct. 3, 2014, the entire disclosure of which is incorporated herein by reference for any and all purposes.

TECHNICAL FIELD

The present disclosure generally relates to laser ablation processes and products produced thereby.

SUMMARY

In a first aspect, a method is provided comprising: providing a workpiece comprising a substrate, a coating layer disposed over a first surface of the substrate, and a mask disposed over a second surface of the substrate; and removing a portion of the coating layer from the workpiece by directing a laser beam at the workpiece such that the laser beam passes through the substrate from the second surface to the first surface before the laser beam impinges on the coating layer. The first surface of the substrate and the second surface of the substrate are opposite surfaces of the substrate, and the mask selectively prevents removal of the coating layer from portions of the workpiece. The method may further comprise disposing the mask over the second surface of the substrate. Disposing the mask may comprise a photolithography process or a printing process. Alternatively, disposing the mask may comprise placing a preformed mask over the second surface of the substrate. Removing the portion of the coating layer may produce portions of the workpiece from which the coating layer has been removed that have a characteristic dimension that is smaller than a laser spot produced by the laser beam. An edge of the coating layer adjacent the portion of the workpiece from which the coating layer has been removed may have a characteristic length, L, that is a length of the portion of the edge of the coating layer in which a thickness of the coating layer tapers from a nominal coating layer thickness, t, to zero thickness, and L is 100 µm or less. Alternatively, L may be 50 µm or less, such as 200 nm or less. An edge of the coating layer adjacent the portion of the workpiece from which the coating layer has been removed may have a uniform shape. An edge of the coating layer adjacent the portion of the workpiece from which the coating layer has been removed may have a scalloped profile. A depth of the scallops may be between 1% and 20% of a diameter of the laser beam. A depth of the scallops may be less than 100 µm. The laser beam may be produced by a laser with a pulse duration in a range of 0.5 to 500 picoseconds. The workpiece may also comprise an electrically conductive layer disposed between the substrate and the coating layer, and the electrically conductive layer is not removed by the laser beam. The electrically conductive layer may comprise a transparent conductive oxide, such as indium tin oxide. The coating layer may comprise a metallic material, such as chromium. The coating layer may comprise multiple layers. An edge of the coating layer adjacent the portion of the workpiece from which the coating layer has been removed may form an average angle with the first substrate surface in a range of 30° to 90°. The portion of the workpiece from which the coating layer is removed may exhibit a transmission haze of 0.25% or less, such as 0.05% or less.

In a second aspect, a method is provided comprising: providing a workpiece comprising a substrate and a coating layer disposed over a first surface of the substrate; and removing a portion of the coating layer from the workpiece by directing a laser beam at the workpiece such that the laser beam passes through the substrate before the laser beam impinges on the coating layer. The laser beam is produced by a laser with a pulse duration in a range of 0.5 to 500 femtoseconds. The workpiece may also comprise a mask disposed over a second surface of the substrate, with the first surface of the substrate and the second surface of the substrate being opposite surfaces of the substrate. The mask may selectively prevent removal of the coating layer from portions of the workpiece.

In a third aspect, a product is provided comprising: a substrate; a coating layer disposed over a first surface of the substrate; and a portion of the first surface of the substrate that is substantially free of the coating layer. An edge of the coating layer adjacent the portion of the first surface of the substrate that is substantially free of the coating layer forms an average angle with the first substrate surface in a range of 30° to 120°, the edge of the coating layer adjacent the portion of the first surface of the substrate that is substantially free of the coating layer has a characteristic length, L, that is a length of the portion of the edge of the coating layer in which a thickness of the coating layer tapers from a nominal coating layer thickness, t, to zero thickness, and L is 100 µm or less. The characteristic length L may be 50 µm or less, such as 200 nm or less. The product may also comprise an electrically conductive layer disposed between the substrate and the coating layer and over the portion of the first surface of the substrate that is substantially free of the coating layer. The coating layer may comprise a metallic material. The portion of the first surface of the substrate that is free of the coating layer may exhibit a transmission haze of 0.25% or less, such as 0.05% or less. The edge of the coating layer adjacent the portion of the first surface of the substrate that is substantially free of the coating layer may have a scalloped profile. A depth of the scallops may be less than 100 µm, such as less than 50 µm. The product may also comprise: a first electrode layer; a second electrode layer; and an electrochromic layer. The electrochromic layer is disposed between the first electrode layer and the second electrode layer, and the first electrode layer is disposed over the portion of the first surface of the substrate that is free of the coating layer.

In a fourth aspect, a vehicle rearview mirror assembly is provided that comprises the product of the third aspect.

BRIEF DESCRIPTION OF THE DRAWINGS

Illustrative embodiments will hereinafter be described in conjunction with the appended drawings, wherein like designations denote like elements.

FIG. 3(a) is a cross-sectional view of a processed edge of a laser ablated coating layer.

FIG. 3(b) is a cross-sectional view of an edge of a coating formed by masking in a material addition process.

FIG. 4(a) is a top view of the processed edge of the laser ablated coating layer.

FIG. 4(b) is a top view of the edge of the coating formed by masking in the material addition process.

FIG. 9(*b*) is a photomicrograph of a laser ablated edge formed by a nanosecond laser.

DETAILED DESCRIPTION

Figure 1:
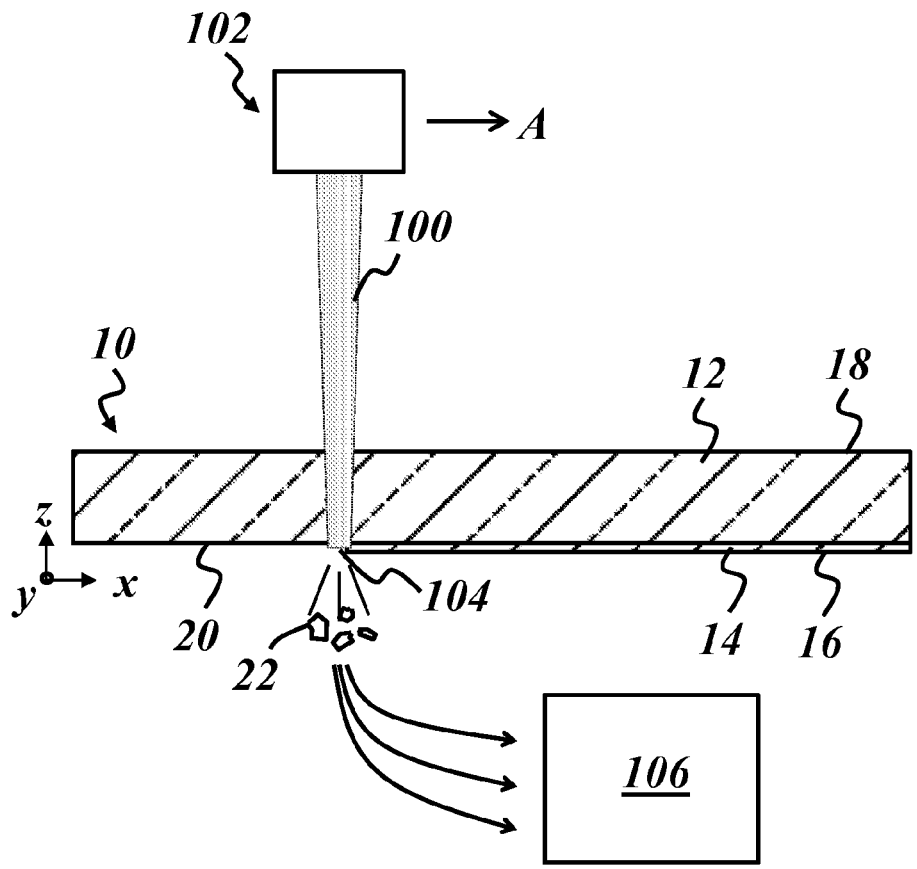
FIG. 1 is a side cross-sectional view of an embodiment of a second surface laser ablation process.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

A laser ablation process generally includes selective removal of material at a surface of a workpiece by directing a laser beam at the workpiece. The laser beam is configured to deliver a controlled amount of energy at a laser spot defined where the beam impinges the desired surface. This controlled amount of energy is selected to liquefy, vaporize, or otherwise rapidly expand the surface material at the laser spot to cause it to separate from the workpiece for removal. Laser ablation can be used to remove at least a portion of one or more coatings from a coated substrate, for example, or to otherwise reshape the workpiece surface.

The present application discloses a method of laser ablation of a coating layer from a first surface of a substrate by passing a laser beam through the substrate before the laser beam impinges on the coating material. The method includes providing a workpiece comprising a substrate, a coating layer disposed over a first surface of the substrate, and a mask disposed over a second surface of the substrate; and removing a portion of the coating layer from the workpiece by directing a laser beam at the workpiece such that the laser beam passes through the substrate from the second surface to the first surface before the laser beam impinges on the coating layer. The first surface of the substrate and the second surface of the substrate are opposite surfaces of the substrate, and the mask selectively prevents removal of the coating layer from portions of the workpiece.

According to another embodiment, a method includes providing a workpiece comprising a substrate and a coating layer disposed over a first surface of the substrate; and removing a portion of the coating layer from the workpiece by directing a laser beam at the workpiece such that the laser beam passes through the substrate before the laser beam impinges on the coating layer. The laser beam is produced by a laser with a pulse duration in a range of 0.5 to 500 femtoseconds.

According to another embodiment, a product includes a substrate having a coating layer disposed over a first surface of the substrate, and a portion of the first surface of the substrate is substantially free of the coating layer. An edge of the coating layer adjacent the portion of the first surface of the substrate that is substantially free of the coating layer forms an average angle with the first substrate surface in a range of 30° to 120°. The edge of the coating layer adjacent the portion of the first surface of the substrate that is substantially free of the coating layer has a characteristic length, L, that is a length of the portion of the edge of the coating layer in which a thickness of the coating layer tapers from a nominal coating layer thickness, t, to zero thickness, and L is 100 µm or less. A vehicle rear view mirror assembly may include the product.

Turning to the figures to illustrate various embodiments, FIG. 1 is a side cross-sectional view of an example of a laser ablation process as performed on a workpiece 10. The workpiece 10 is a coated substrate, including a substrate 12 and a coating layer 14. The illustrated process is a second surface ablation process in which the coating layer 14 is located at a second side 16 of the workpiece 10 opposite a first or impingement side 18 of the workpiece. A laser beam 100 is provided by a laser source 102 and propagates toward the workpiece. In this example, the laser beam 100 is configured with a focal plane at or near a second surface 20 of the substrate 12 and generally parallel with the x-y reference plane to define a laser spot 104 at the second surface. In other examples, the focal plane can be spaced from the second surface 20 by an amount greater than 0 mm up to about 50 mm. The substrate 12 is at least partially transparent to the particular wavelength of laser light of the laser beam 100 so that the beam passes through the thickness of the substrate to the second surface 20, where the material of the coating layer 14 absorbs at least some of the energy of the laser beam and is thereby separated from the substrate.

In the example of FIG. 1, the removed coating layer material 22 is illustrated in the form of solid particles. The workpiece 10 can be oriented as shown so that gravity causes the removed material 22 to fall away from the workpiece 10. Optionally, a vacuum source 106 is provided to help guide the removed material 22 away from the workpiece 10. The removed material 22 may be in vapor or liquid form when initially separated from the substrate 12. The illustrated arrangement is useful to prevent the removed material 22 from being redeposited on the workpiece 10, which can be problematic with some first surface ablation processes. The material may also be removed via a spallation process.

Figure 2:
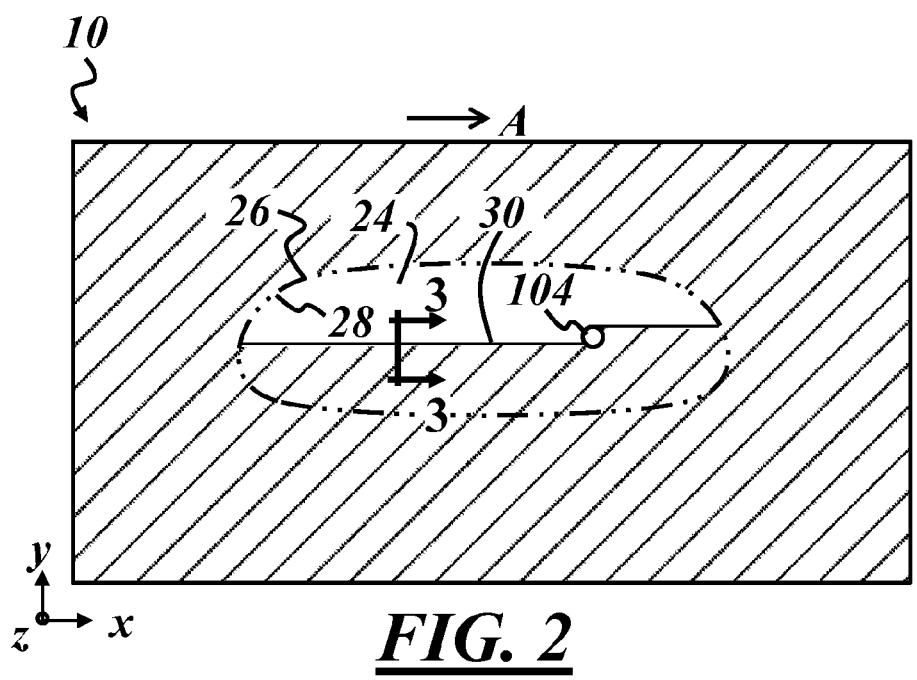
FIG. 2 is a top view of the process of FIG. 1.

In order to remove material from an area of the workpiece 10 that is larger than the laser spot 104, the laser beam 100 and/or the workpiece 10 may be moved relative to each other to remove material at a plurality of adjacent and/or overlapping laser spot locations. For instance, after the desired amount of material is removed at a first laser spot location, the workpiece 10 and/or laser beam 100 may move to define a second laser spot location for further removal of material. Continued movement to multiple adjacent or overlapping laser spot locations with corresponding material removal at each location defines an ablated area 24 of the workpiece 10 from which material has been removed, as shown in a top view of the process in FIG. 2, where an intended ablation area 26 is shown in phantom. In FIGS. 1 and 2, the laser beam 100 is moving in an instant process direction A with respect to the workpiece 10. One or both of the laser beam 100 or the workpiece 10 may be moved to achieve this relative movement. In one example, the laser beam 100 moves or scans back and forth in the positive and negative x-direction within the intended ablation area 26, and the laser beam and/or the workpiece 10 is indexed in the y-direction each time the laser beam reaches an edge 28 of the intended ablation area until the coating layer 14 is removed within the entire intended area.

A high-frequency pulsed laser may be used in conjunction with workpiece 10 and/or laser beam 100 movement at a particular rate in the process direction to determine the spacing between adjacent laser spot locations. In a non-limiting example, a laser beam operating with a pulse frequency of 400 kHz with a rate of movement with respect to the workpiece of 20 m/s in the process direction will result in laser spot locations every 50 µm in the process direction. Laser spot locations thus overlap when the cross-sectional dimension of the laser beam 100, measured in the process direction, is greater than the spacing between adjacent laser spot locations. A single pulse or a pulse burst may be delivered at each laser spot location, where the pulse durations are generally one or more orders of magnitude less than the time between pulses. Spacing among laser spot locations may be selected so that adjacent spot locations at least partially overlap to ensure material removal between adjacent locations, particularly with non-rectangular beam cross-sections.

The illustrated process is useful as an alternative to material addition processes to form a product with coated and uncoated portions. Material addition processes (e.g., painting, plating, vapor deposition, sputtering, etc.) typically require the use of some form of masking to help define a boundary between the coated and uncoated portions by preventing the coating material from being deposited at the desired uncoated portion. In such processes, a physical mask may be placed between a coating material source and the substrate to physically block the coating material at the desired uncoated portion(s) of the substrate, or a resist coating material may first be coated onto the desired uncoated portion (while masking the desired coated portion) and subsequently removed after the coating material is deposited over the substrate, including over the resist coating layer.

In the above-described laser ablation process, the workpiece 10 can be presented with the coating layer 14 at both of the desired coated and uncoated portions (e.g. an entire substrate surface), and the coating layer can be selectively removed to form the uncoated portion (i.e., the intended ablation area 26). The laser ablation process can reduce or eliminate the need for the additional tooling and process steps that are required in material addition processes where it is desired to coat only a portion of the substrate. The laser ablation process is also more flexible, as the size and/or shape of the intended ablation area 26 (i.e., the uncoated portion of the product) can be changed through a relatively simple reprogramming of the laser system without the need to clean or produce new physical components such as masks.

In addition, newly formed edges of the coating layer 14 may be better defined than corresponding edges of a coating deposited in a material addition process. This phenomenon is illustrated schematically in FIGS. 3 and 4. FIG. 3(a) is a cross-sectional view of a processed edge 30 of the coating layer of FIG. 2, and FIG. 3(b) is a cross-sectional view of an edge 30' of a coating layer applied in a material addition process with masking. As shown in FIG. 3(a), the processed edge 30 can be formed at an angle θ with the underlying surface 20 that is substantially perpendicular or near perpendicular. The coating layer produced by masking and coating deposition shown in FIG. 3(b) has an edge 30' that gradually tapers from the full thickness of the coating layer over a much greater characteristic length L and forms a much lower average angle θ with the substrate, due in part to shadowing effects from the mask. The laser ablation process can produce an angle θ between the edge 30 and the substrate surface 20 in a range from 30 degrees to 90 degrees, or from 30 degrees to 120 degrees. In some applications, an angle θ on the higher end of this range may be preferred, such as a range from 70 degrees to 90 degrees.

The characteristic length L of the taper from full thickness to zero thickness can be related to the laser spot size and/or the coating thickness in the laser ablation process. In some embodiments, the characteristic length L is less than or equal to one half of the diameter or width of the laser spot. Thus, for a 200 µm diameter laser spot, the characteristic length L may be 100 µm or less. In some cases, the characteristic length L is less than or equal to one quarter of the diameter or width of the laser spot—i.e., 50 µm or less with a 200 µm laser spot. The characteristic length L may be less than or equal to twice the nominal thickness of the coating layer 14, such that a 100 nm coating layer may have a processed edge 30 that tapers from 100 nm to zero over a length of 200 nm or less. In other examples, the characteristic length L may be up to 10 times the nominal thickness of the coating layer. In other embodiments, the characteristic length L is less than or equal to the nominal thickness of the coating layer 14, or only a fraction of the nominal thickness of the coating layer, such as from 0.01 to 0.99 times the nominal thickness of the coating layer. In embodiments where θ is near 90 degrees, for example, the characteristic length L may be in a range from about 0.01 to about 0.10 times the nominal thickness of the coating layer. In other embodiments, the characteristic length L may be in a range from about 0.01 to about 1.0 times the nominal thickness of the coating layer. The characteristic length L may be 100 µm or less, such as 75 µm or less, 50 µm or less, 25 µm or less, 10 µm or less, 1 µm or less, 500 nm or less, or 200 nm or less.

FIG. 4(a) is a schematic top view of FIG. 3(a), illustrating the shape of the ablated edge 30 on a microscale. The edge 30 is characterized by a scalloped shape, resulting from partially overlapping laser spot locations with a round or circular laser beam cross-section. As shown, the edge 30 is not perfectly straight when viewed on a size scale close to that of the laser spot size. The shape of the illustrated edge 30 may be uniform, however, even if not perfectly straight or smooth. For instance, when the laser ablation process is configured so that the laser beam and workpiece move at a constant relative speed with laser pulses delivered to the workpiece at a constant frequency, the processed edge 30 has a periodic shape with equal peak-to-peak and valley-to-valley spacing D in the process direction, as shown. The peak-to-valley distance d, measured in a direction transverse to the process direction, may increase with increased process motion or speed and decrease with increased laser pulse frequency, both of which are related to the amount of overlap associated with adjacent laser spot locations. In one example, where the distance D between laser spot locations is about one-third the diameter of the laser beam, the depth d of the scallops may be about 2-5% the diameter of the laser beam. A smaller distance D, such as one-quarter the diameter of the laser beam, leads to a smaller depth d, such as about 2% of the diameter of the laser beam. A larger distance D, such as one-half the diameter of the laser beam, leads to a larger depth d, such as about 6-8% of the diameter of the laser beam. The depth d may be about 1-20% of the diameter of the laser beam, such as 2-8% of the diameter of the laser beam. Stated quantitatively, the depth d may be 100 µm or less, such as 75 µm or less, 50 µm or less, 25 µm or less, 10 µm or less, 1 µm or less, 500 nm or less, or 200 nm or less.

While the edge 30 may not be perfectly smooth or linear on the illustrated microscale, the periodic uniformity of the processed edge helps provide a smooth appearance when perceived by the naked eye. As shown in FIG. 4(b), a material addition process with masking produced edge 30' is also not perfectly smooth on a microscale. The non-uniformity along the edge 30' shown in FIG. 4(b) leads to a macro visual appearance that may be perceived as an unsmooth edge, even if the average peak-to-valley depth d is the same as that produced with the laser ablation process.

Figure 5:
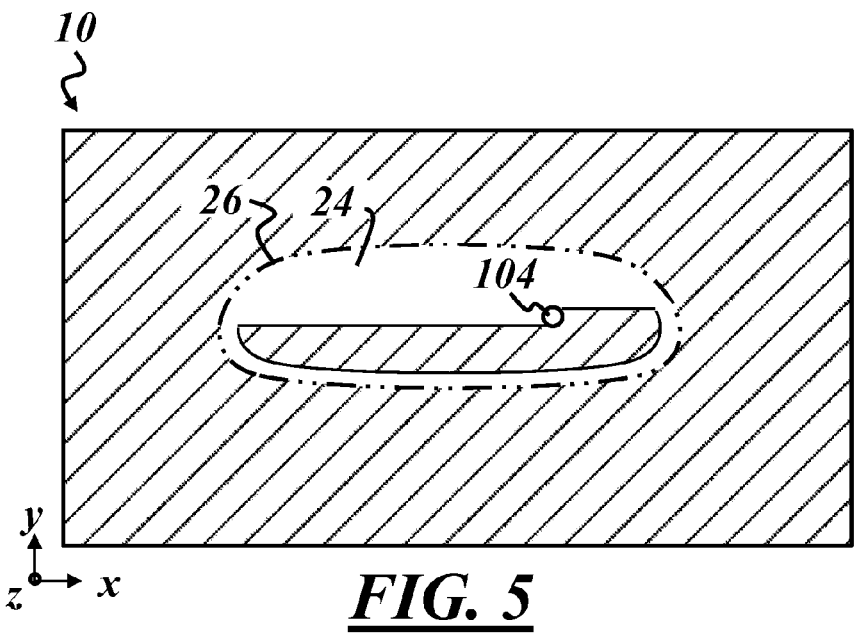
FIG. 5 is a top view of the process of FIG. 1 illustrating an alternative process path.

FIG. 5 illustrates an embodiment in which the laser ablation process is performed along a perimeter of the intended ablation area 26 before the remaining portion within the perimeter is ablated. The speed of the laser beam with respect to the workpiece 10 along the process path may be constant in the instantaneous direction of movement along the perimeter of the intended ablation area 26 to achieve a uniform edge at the perimeter. Performing the ablation process such that a portion of the overall process path follows the shape of the perimeter of the intended ablation area 26 facilitates use of a larger laser beam cross-section and shorter process times by enabling the use of less overlap in one of the index axes while also providing a processed edge at the perimeter of the ablation area that has a smooth appearance, particularly with non-rectangular ablation areas that have curvilinear edges such as in FIGS. 2 and 5. Alternatively, the perimeter of the ablation area can be the final portion of the area from which the coating layer is removed.

The process is of course not limited to removing the entire coating layer in any particular area of the workpiece. The laser ablation process can be used to selectively remove coating material to form decorative patterns, functional patterns, and/or indicia, for example. Desired patterns or indicia can be formed from the portion of the coating layer remaining over the substrate after the ablation process, or they can be formed by the ablated area itself. Second surface ablation has the additional advantage that, due to the at least partially transparent substrate, decorative features or indicia can be viewed through the first side of the finished product. The ablated workpiece can be assembled with the remaining coating layer facing toward the inside of an assembly such that it is protected from damage and from the environment by the substrate.

Figure 6:
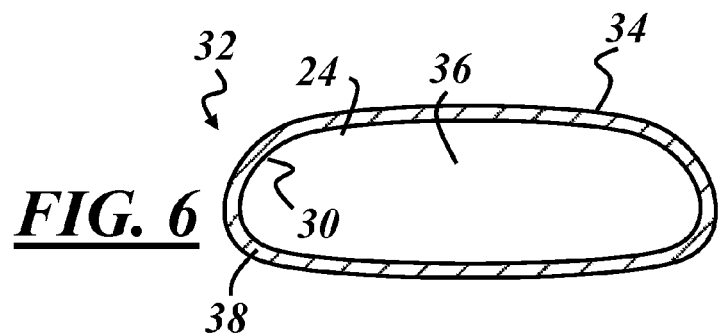
FIG. 6 is a component formed from ablated workpiece of FIG. 5.

FIG. 6 illustrates one example of a component 32 that can be formed from the ablated workpiece. Component 32 is taken from the interior of the workpiece 10 of FIG. 5 by cutting, scoring, or otherwise separating it from the surrounding portion of the ablated workpiece. In one embodiment, a series of laser induced channels can be formed in the substrate along a desired line of separation to facilitate removal of the component 32 from the ablated workpiece. Examples of laser induced channels and processes for forming them in a substrate are described in greater detail by Bareman et al. in U.S. Pat. No. 8,842,358. An edge 34 of the component 32 is formed along the line of separation. In this example, the edge 34 circumscribes the ablated area 24 formed during the ablation process and is generally parallel with the processed edge 30 of the remaining coating layer. The component 32 thus formed includes a window 36 with the transparency of the substrate and a border 38 having the optical and other physical properties of the coating layer material.

The border 38, and in fact the coating layer of the original workpiece, may be formed from nearly any material (e.g., metallic, plastic and/or ceramic) and may generally be less transparent than the substrate. Certain metallic materials, such as chromium or chromium-containing materials, may be multi-functional, providing reflectivity, opacity, conductivity, along with a potentially decorative aspect. In some embodiments, the coating layer as provided to the ablation process is itself a multi-layer coating. For instance, the coating layer may include a reflective layer in direct contact with the substrate and a light-absorbing layer over the reflective layer to minimize reflection of the laser light in the ablation process.

In one embodiment, the component 32 or similar component having a coating layer from which material has been laser ablated, is a mirror component, such as a component of a vehicle rearview mirror assembly. The border 38 of the component 32 may serve to eliminate the need for a separate frame for such a mirror and may also serve other functions, such as providing electrical conductivity, electrical insulation, reflectivity, and/or concealing electrical connections or other mirror assembly components. In one particular example, the component 32 is the front piece of an electrochromic mirror assembly in which an electrochromic medium is encapsulated in a cavity formed between the back side of the component 32 (i.e., the second side 16 of the original workpiece 10 of FIG. 1) and a second similarly shaped component. Some examples of electrochromic mirror assemblies are also given in the above-referenced U.S. Pat. No. 8,842,358 and in some of the documents referenced therein. Other non-mirror electrochromic devices (e.g., electrochromic windows or lenses) may also be formed from the ablated workpiece, as can non-electrochromic assemblies.

Some devices that may employ at least a portion of the laser ablated workpiece, such as electrochromic devices, may require one or more electrically conductive layers such as an electrode layer. In an electrochromic device, for example, electrodes may be included on opposite sides of the electrochromic medium wherever it is desired to activate the electrochromic medium in the device. The component 32 may thus also include an electrically conductive layer along at least a portion of the window 36, corresponding to the ablated portion 24 of the original workpiece. The electrically conductive layer may be formed from a transparent conductive oxide (TCO) or other suitable conductive material, such as indium tin oxide (ITO). In one embodiment, the conductive layer overlies the entire window 36.

Figure 7:
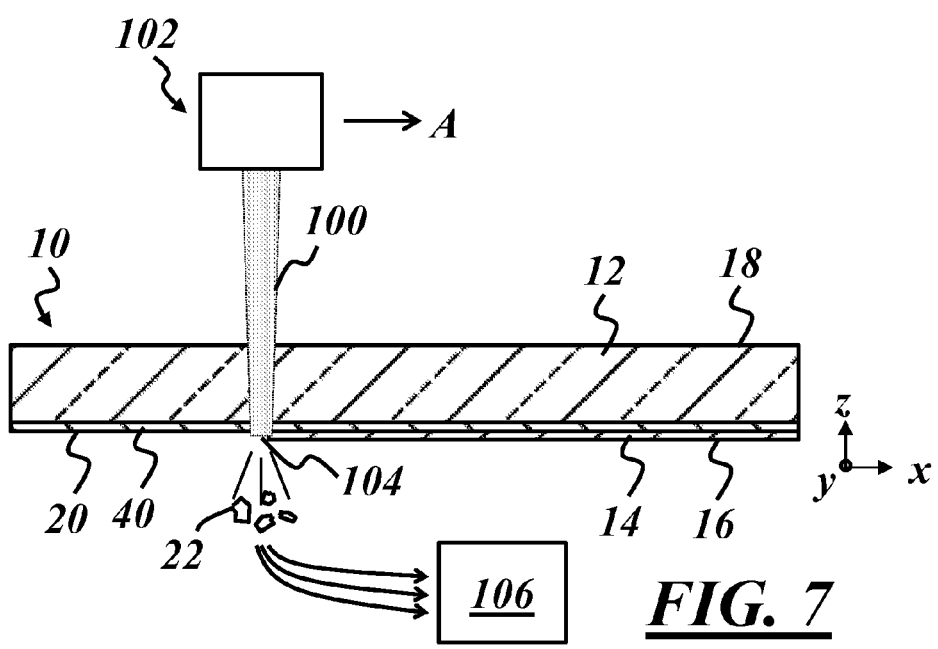
FIG. 7 is a side cross-sectional view of an embodiment of the second surface laser ablation process, where the workpiece includes an additional material layer.

As shown in FIG. 7, the above-described second surface laser ablation process is compatible with TCO materials or other at least partially transparent conductive layers. The workpiece 10 in the illustrated process includes an electrically conductive layer 40 at the second side 16 of the workpiece between the substrate 12 and the coating layer 14. The conductive layer 40 provides the second surface 20 from which the coating layer 14 is removed, in this example.

The illustrated process represents an example of a laser ablation process in which the laser beam 100 propagates through the conductive layer, such as a metallic layer, to remove material from an opposite side of the conductive layer. In other embodiments, the electrically conductive layer may be disposed over the second side of the workpiece after the ablation process. This alternative allows for application of the conductive layer only on selected workpieces. The laser wavelength may be selected to minimize absorption by the conductive layer. In one non-limiting example, a laser having a wavelength of 532 nm is used with an ITO conductive layer in order to minimize damage to the conductive layer.

While the above-described laser ablation process can provide a processed workpiece with coated and uncoated portions without the need for the masking that is typical of material addition coating processes, masking can be advantageously employed in the laser ablation process. Masked laser ablation can form features that are sharper than those formed in masked material addition coating processes and, in some cases, sharper than those formed by laser ablation alone. For instance, when a desired characteristic feature size is smaller than the cross-sectional size of the laser beam, masked ablation can be used to obtain such features without the negative effects associated with masked material addition coating processes.

Figure 8:
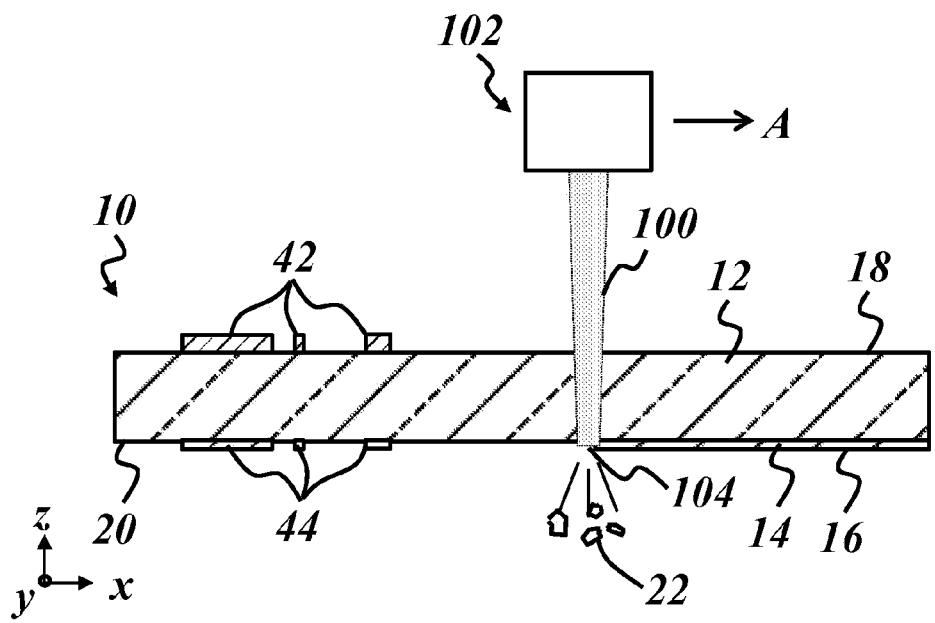
FIG. 8 is a side cross-sectional view of an embodiment of a masked laser ablation process.

One example of a masked laser ablation process is illustrated in FIG. 8. In this example, a mask 42 is provided at the first side 18 of the workpiece. The mask 42 includes open or otherwise light-transmitting portions and solid or otherwise light-filtering portions. When the laser beam 100 encounters the solid portions of the mask 42 while moving relative to the workpiece 10 in the process direction A, the beam is selectively blocked by the solid portions of the mask. Features 44, such as indicia, are thereby formed directly opposite the solid portions of the mask 42 in the form of unablated portions of the coating layer. The solid portions of the mask 42 need not be completely opaque or light-blocking. It is only necessary to attenuate the laser beam by an amount sufficient to prevent ablation at the second surface 20. In fact, the masked ablation process facilitates optimization of certain aspects of the ablation process such that preventing only a small portion of the light from being transmitted through the substrate may be necessary to form features 44.

For instance, one manner of optimizing the laser ablation process is to maximize the removal rate of the coating layer 14 by maximizing the cross-sectional size of the laser beam 100 and the associated laser spot 104 (e.g., via selection of laser optics), along with the speed at which the laser is rastered along the workpiece 10. This optimization is limited by the flux at the second surface 20 being reduced as the square of the beam radius at the surface. Above a threshold spot size, the energy flux falls below the ablation threshold for the coating layer, resulting in a net loss of performance. It is thus useful to configure the laser spot size and raster speed to just above the ablation threshold to reduce the process cycle time. A large spot size improves overall coating removal rate, but it may limit the size scale on which indicia can be formed, in the absence of masking. For example, if a 200 micron diameter laser spot size is used to rapidly remove the coating layer, smooth and/or fine features on a 50 or 100 micron scale cannot be formed, whether part of indicia or other features, due both to the overall size of the spot and its round shape. Employing a non-circular beam (e.g., rectangular) can help eliminate the above-described scalloped shape of the processed edge and reduced the amount of overlap required by adjacent laser spot locations. But formation of features smaller than the laser spot is problematic, even with shaped beams. Some processes employ a second, smaller beam to form the small features while using a larger optimized beam to remove the bulk of the coating layer material.

The masked laser ablation process eliminates the need for a second laser beam and the associated second process path, resulting in a much faster process that can use a single optimized beam. As used in the laser ablation process, the mask 42 provides other process advantages. For instance, there is no coating material deposited on the mask 42 in the laser ablation process as is sometimes the case in masked coating processes. Also, the mask may be formed from materials that are not compatible with masked coating processes. For example, some coating processes are performed at high temperatures and/or with chemically active or reactive materials. The masks used in such processes must withstand these harsh conditions, while the mask 42 used in the laser ablation process is not exposed to high temperatures or a reactive environment. The mask 42 only encounters the laser beam 100. Moreover, the mask 42 is located away from the focal plane of the laser beam 100 and is thus less affected or relatively unaffected by the energy of the beam.

In one embodiment, the mask 42 is formed in place on the first side 18 of the workpiece 10. Photolithography is one process that can form the mask 42 in the desired pattern. But photolithography can be expensive, time-consuming, and may require a mask of its own. Another method of forming the mask 42 in place on the first side 18 of the workpiece is by printing. A printing technique such as inkjet printing can be used to form the mask 42 by selectively depositing the mask material along the workpiece 10. With the mask 42 formed in place by printing, the size scale of the features 44 that can be formed by laser ablation is limited by the resolution of the printing technique rather than by the laser spot size. Alternatively, a pre-formed mask may be placed over the first side 18 of the workpiece. The pre-formed mask may be held in place over the workpiece by any appropriate means, such as a clamp. The pre-formed mask may be reusable, such that it may be employed in the laser ablation of multiple workpieces.

In some cases, the above-described laser ablation process results in an ablated area with a measurable transmission haze. Transmission haze may result from diffusion or scattering of some of the light passing through the ablated substrate. While the exact cause of the haze is not fully understood, it may be attributed to residual coating layer material and/or inter-compounds of the coating material and the underlying material. The haze may also be partly attributed to some roughening, damage, or other material change at the removal surface, whether caused directly by the energy of the laser beam, or indirectly by forces or other phenomena resulting from the separation of the coating layer from the underlying material. The ablated area of the workpiece may have a transmission haze of 0.25% or less, on average, such as 0.2% or less, 0.15% or less, or 0.1% or less. It is possible to form the ablated area of the workpiece with a transmission haze of 0.05% or less, on average. In some cases, the haze may be higher, and the maximum allowable haze may depend on the intended use of the workpiece.

One manner of reducing the haze associated with the laser ablation process is through the use of a laser system that delivers pulses of the laser beam on a picosecond or shorter time scale. Picosecond lasers are configured to deliver the energy necessary for coating material removal in laser pulses with durations in a range from about 0.5 to about 500 picosends (ps). Pulse durations of several tens of picoseconds may be preferred, such as 1-50 ps or 50 ps or less. Commercially available picosecond lasers can provide pulse durations of less than 20 ps, less than 10 ps, less than 5 ps, or less than 1 ps, to name a few. Femtosecond lasers having a pulse duration in a range from about 0.5 to about 500 femtoseconds (fs) can provide some of the same advantages as picosecond lasers when compared with nanosecond lasers (0.5 to 500 ns pulse duration).

Figure 9A:
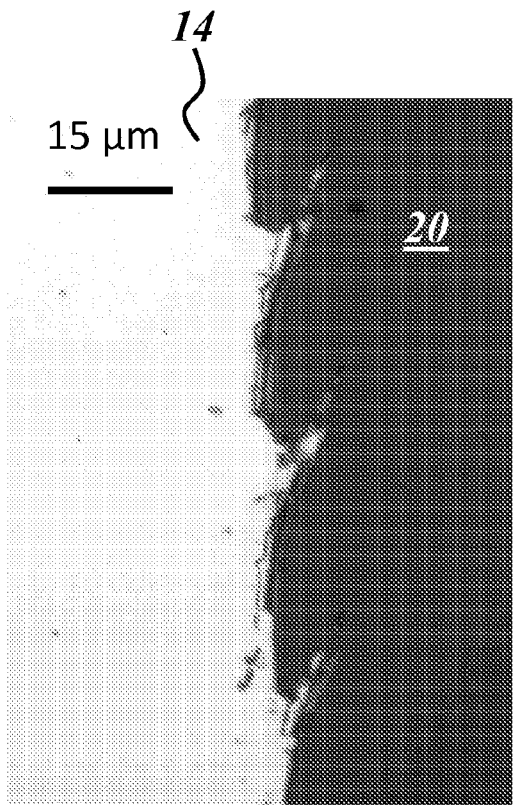
FIG. 9(*a*) is a photomicrograph of a laser ablated edge formed by a picosecond laser.
Figure 9B:
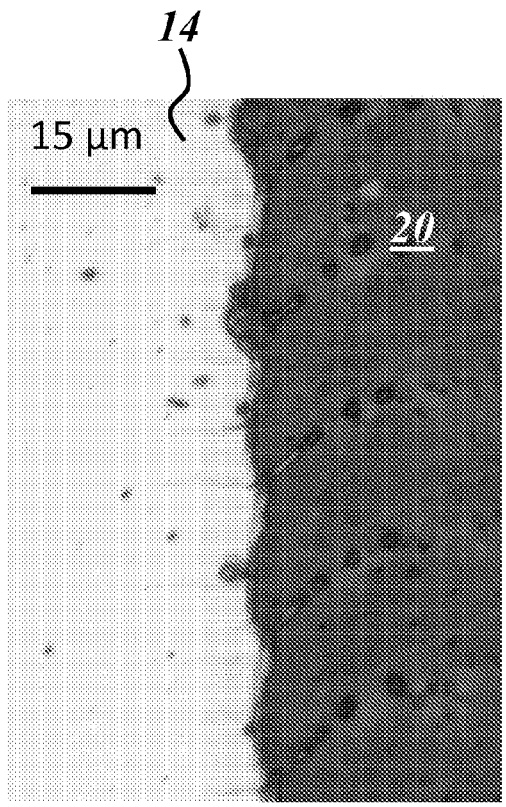

FIGS. 9(a) and 9(b) are photomicrographs of processed edges of metallic coating layers 14 formed by laser ablation. A picosecond laser was used to remove the coating layer 14 from the substrate 12 in FIG. 9(a), and a nanosecond laser was used to remove the coating layer from the substrate in FIG. 9(b). The amount of haze at the ablated area of the picosecond laser ablated workpiece is visibly less than that of the nanosecond laser ablated workpiece. Generally, the heat-affected zone is smaller with the picosecond laser. In addition to the lower amount of haze associated with the picosecond laser, the uniform (i.e., periodic) shape of the processed edge is more apparent than with the nanosecond laser, possibly due to less molten coating material being formed during processing. The nanosecond laser processed edge of FIG. 9(b) also has apparent microcracks extending away from the edge and into the remaining coating layer. The microcracks are about 10-15 microns long, on average, and are spaced along the processed edge about every 5-15 microns.

Another aspect of the invention is a method comprising the step of directing a laser beam at a first side of a workpiece to remove material from an opposite second side of the workpiece. The workpiece may comprise a substrate that is at least partially transparent to the laser beam and a coating layer comprising the removed material. The workpiece may also comprise an electrically conductive layer that is not removed by the laser beam. The method may also comprise the step of providing a mask to selectively prevent material removal from the second side of the workpiece. The method may also comprise the step of providing a printed mask at the first side of the workpiece. The method may also comprise the step of forming a laser ablated feature with a characteristic dimension that is smaller than a laser spot defined by the laser beam. The method may produce a processed edge of a coating layer from which material is removed by the laser beam that tapers from a nominal coating layer thickness to zero thickness over a distance that is less than twice the nominal thickness. The method may produce a processed edge of a coating layer from which material is removed by the laser beam that forms an average angle with an underlying substrate surface in a range from 30 to 90 degrees. The method may produce a processed edge of a coating layer from which material is removed by the laser beam that has a uniform shape. The method may also comprise the steps of removing material along a perimeter of an intended ablation area before removing other material within the intended ablation area. The laser beam may be provided by a picosecond pulsed laser. The removed material may be metallic and reflective when part of the workpiece.

Another aspect of the invention is a product comprising at least a portion of a workpiece produced according to the method described above. The product may comprise a component formed from the workpiece by separating the workpiece into more than one portion. The product may comprise a vehicle rearview mirror assembly. The product may also comprise an electrochromic medium located between electrode layers, with at least one of said electrode layers being located on the workpiece. The product may also comprise an electrically conductive layer that provides the second surface. The laser-processed edge of the product may not be a scalloped edge. The product may also comprise a laser ablated feature with a characteristic dimension that is smaller than a laser spot defined by the ablating laser beam. The processed edge may taper from a nominal coating layer thickness to zero thickness over a distance that is less than twice the nominal thickness. The processed edge may form an average angle with an underlying substrate surface in a range from 30 to 120 degrees. The processed edge may have a uniform shape. The coating layer material may be metallic and reflective. The product may also comprise an electrochromic medium located between electrode layers, with at least one of said electrode layers being located along the laser-ablated portion of the substrate.

Another aspect of the invention is a product comprising a substrate that is at least partially transparent and a coating layer over a portion of the substrate, the coating layer having a laser-processed edge defined between the coated portion and a second surface laser-ablated portion of the substrate. The coating layer of the product is less transparent than the substrate material. The product may also comprise an electrically conductive layer that provides the second surface. The laser-processed edge of the product may not be a scalloped edge. The product may also comprise a laser ablated feature with a characteristic dimension that is smaller than a laser spot defined by the ablating laser beam. The processed edge may taper from a nominal coating layer thickness to zero thickness over a distance that is less than twice the nominal thickness. The processed edge may form an average angle with an underlying substrate surface in a range from 30 to 120 degrees. The processed edge may have a uniform shape. The coating layer material may be metallic and reflective. The product may also comprise an electrochromic medium located between electrode layers, with at least one of said electrode layers being located along the laser-ablated portion of the substrate.

Another aspect of the invention is a vehicle rearview mirror assembly including the product described above.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "having," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A product comprising:
a substrate;
a coating layer disposed over a first surface of the substrate;
a portion of the first surface of the substrate that is substantially free of the coating layer; and
an electrically conductive layer disposed between the substrate and the coating layer and over the portion of the first surface of the substrate that is substantially free of the coating layer;
wherein an edge of the coating layer adjacent the portion of the first surface of the substrate that is substantially free of the coating layer forms an average angle with the first substrate surface in a range of 30° to 120°, the edge of the coating layer adjacent the portion of the first surface of the substrate that is substantially free of the coating layer has a characteristic length, L, that is a length of the portion of the edge of the coating layer in which a thickness of the coating layer tapers from a nominal coating layer thickness, t, to zero thickness, and $L \leq 100$ μm.

2. The product of claim 1, wherein $L \leq 50$ μm.

3. The product of claim 2, wherein $L \leq 200$ nm.

4. The product of claim 1, wherein the coating layer comprises a metallic material.

5. The product of claim 1, wherein the portion of the first surface of the substrate that is free of the coating layer exhibits a transmission haze of 0.05% or less.

6. The product of claim 1, wherein the portion of the first surface of the substrate that is free of the coating layer exhibits a transmission haze of 0.25% or less.

7. The product of claim 1, wherein the edge of the coating layer adjacent the portion of the first surface of the substrate that is substantially free of the coating layer has a scalloped profile.

8. The product of claim 7, wherein a depth of the scallops is less than 100 μm.

9. The product of claim 8, wherein a depth of the scallops is less than 50 μm.

10. The product of claim 1, further comprising:
a first electrode layer;
a second electrode layer; and
an electrochromic layer;
wherein the electrochromic layer is disposed between the first electrode layer and the second electrode layer, and the first electrode layer is disposed over the portion of the first surface of the substrate that is free of the coating layer.

11. A vehicle rearview mirror assembly comprising a product comprising:
a substrate;
a coating layer disposed over a first surface of the substrate;
a portion of the first surface of the substrate that is substantially free of the coating layer; and
an electrically conductive layer disposed between the substrate and the coating layer and over the portion of the first surface of the substrate that is substantially free of the coating layer;
wherein an edge of the coating layer adjacent the portion of the first surface of the substrate that is substantially free of the coating layer forms an average angle with the first substrate surface in a range of 30° to 120°, the edge of the coating layer adjacent the portion of the first surface of the substrate that is substantially free of the coating layer has a characteristic length, L, that is a length of the portion of the edge of the coating layer in which a thickness of the coating layer tapers from a nominal coating layer thickness, t, to zero thickness, and $L \leq 100$ μm.

* * * * *